(12) United States Patent
Piikivi

(10) Patent No.: US 7,533,065 B2
(45) Date of Patent: May 12, 2009

(54) ADVANCED METHOD AND ARRANGEMENT FOR PERFORMING ELECTRONIC PAYMENT TRANSACTIONS

(75) Inventor: Lauri Piikivi, Oulu (FI)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 10/167,153

(22) Filed: Jun. 10, 2002

(65) Prior Publication Data

US 2002/0198849 A1    Dec. 26, 2002

(30) Foreign Application Priority Data

Jun. 20, 2001    (FI)    .................................. 20011312

(51) Int. Cl.
*G06F 17/60*    (2006.01)
(52) U.S. Cl. .............................. 705/76; 705/50; 705/52; 713/175
(58) Field of Classification Search ................... 705/76, 705/50, 52; 713/175
See application file for complete search history.

(56) References Cited

U.S. PATENT DOCUMENTS 5,960,083 A * 9/1999 Micali ........................ 713/175
6,512,919 B2 * 1/2003 Ogasawara .............. 455/422.1

FOREIGN PATENT DOCUMENTS

| DE | 19961793 C1 | | 1/2001 |
|---|---|---|---|
| EP | 1061484 A2 | * | 12/2000 |
| EP | 1096439 A2 | | 5/2001 |
| GB | 2355151 | | 4/2001 |
| JP | 2004153476 | * | 5/2004 |
| WO | WO 97/45814 | | 12/1997 |
| WO | WO 99/22346 | | 5/1999 |

OTHER PUBLICATIONS

"Lehdistotiedotteet", Release Jun. 20, 2000.

* cited by examiner

*Primary Examiner*—Pierre E Elisca
(74) *Attorney, Agent, or Firm*—Perman & Green, LLP

(57) ABSTRACT

The invention relates to a method and arrangement for making electronic purchases. In the method according to the invention, a creditor (11) grants to a customer (10) a certificate provided with an electronic signature, and the customer stores said certificate in an electronic device (13). In connection with a purchase transaction, the customer produces the certificate to an automatic service or goods vending machine (14), which checks the certificate information. If the information is accepted, the desired purchase can be made, and the purchase information is saved in the memory of the vending machine (14). The separate purchase information stored in the vending machine memory is transferred in one batch to the data system (12) of the creditor organization (11), when a predetermined criterion is fulfilled.

47 Claims, 3 Drawing Sheets

ADVANCED METHOD AND ARRANGEMENT FOR PERFORMING ELECTRONIC PAYMENT TRANSACTIONS

Figure 1:
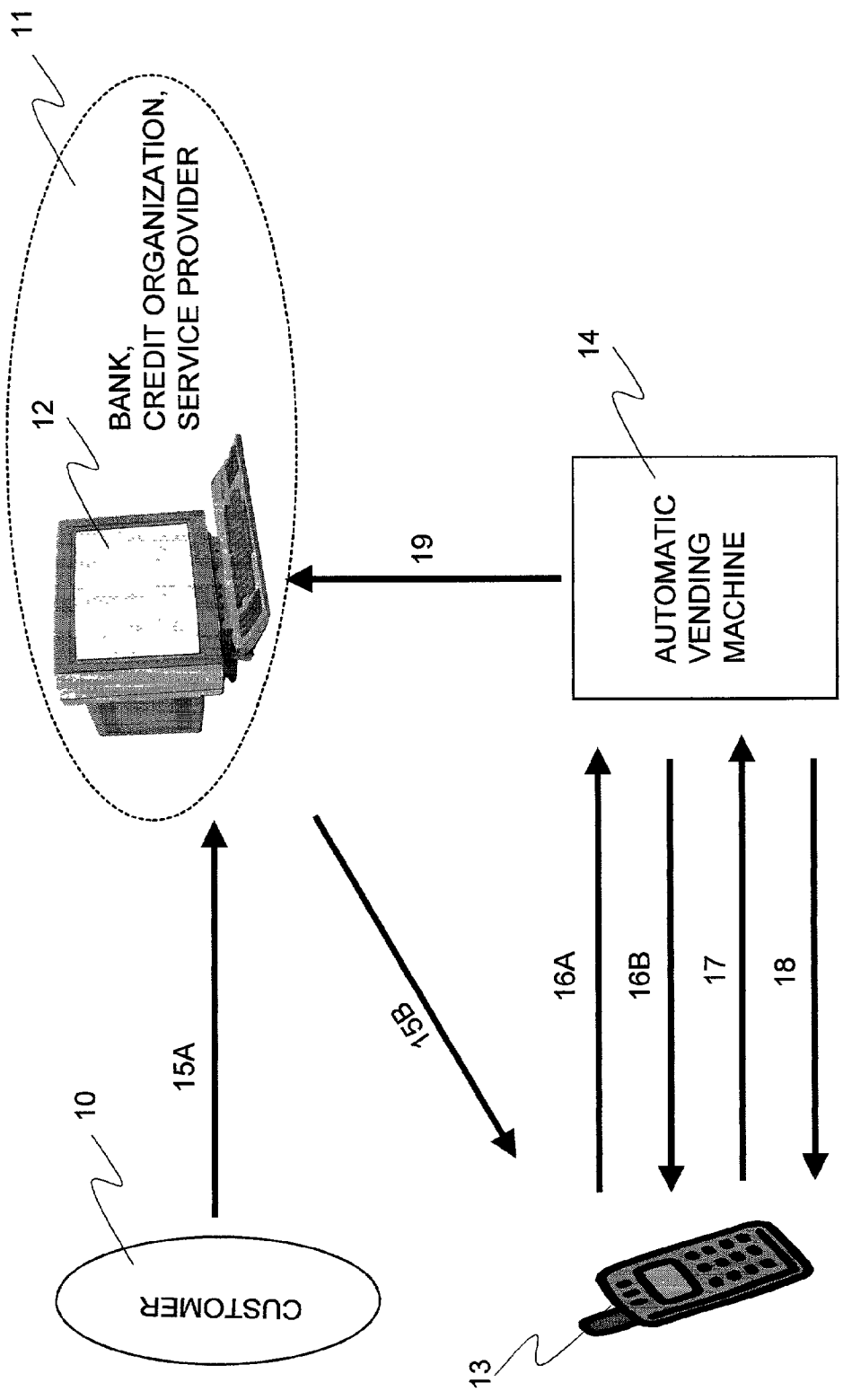

The invention relates to a method for making purchases and paying for them by means of an electronic device, in which method the creditor grants credit to the customer, said credit is deposited in an electronic device of the customer, the customer establishes a connection by using said electronic device with a goods or services automatic vending machine, the customer uses the credit deposited in the electronic device for making a purchase from said goods or services automatic vending machine, whereafter the automatic vending machine charges the creditor for the performed purchase. The invention also relates to a hardware arrangement used in the implementation of said method, an electronic device utilizing the invention and software applications needed for realizing the method.

Commercial practices are swiftly undergoing a change towards completely electronic purchases and payment transactions. By using various payment terminals and bank or credit cards, payment transactions can be performed without handling hard cash at all. However, a successfully performed transaction requires that the beneficiary has at his disposal an arrangement that can register in its memory the sum of the payment and send a message corresponding to said payment either immediately or later to an account database managed by a bank.

A product or a service can also be paid by means of various cellular network terminals. From the patent application WO 99/22346, there is known a method and arrangement by means of which a private mobile phone user can purchase goods or services from various automatic vending machines by using his own cellular phone. When the cellular phone user wishes to purchase a service or a product by phone, he must dial a telephone number given by a service/goods provider, said telephone number being connected to a given automatic vending machine. The purchased service or goods are charged in connection with the normal telephone bill of the cellular phone. In the described method, the service or goods provider must always make an agreement with the cellular network operator for each automatic vending machine in order to carry out the payment procedures. The client is always charged with some delay, which causes interest losses to one of the participants of the commercial transaction. In addition, the described payment procedure increases the credit risks of the service provider proper and of the network operator participating in the operation.

There are also known payment procedures that are called mobile banks. In these payment procedures, the money deposit and transfer actions are carried out by a company that creates in its data system accounts for each customer. Payments and money transfers to and from an account are carried out for instance by means of mobile terminals belonging to the GSM (Global System for Mobile communications). A person operating the system transmits data connected to a given payment transaction by means of an SMS (Short Message Service) message used in the GSM to said data system. In order to be able to use said arrangement, each customer must register himself as a user of the mobile bank. The user must either transfer funds directly from another financial institution to his account in the mobile bank, or grant the mobile bank manager permission to charge the user's bank account in another bank for purchases made through the mobile bank. The use of the system is exclusively limited to such service or goods providers who have made an agreement with the mobile bank.

Regular banks also offer payment services through the Internet for enterprises and for private customers. Money transactions must be made by means of a connection established with the bank's data system. In this system, the purchase proper of the service or goods in question is carried out through some other data transmission connection, and only the payment transaction is carried out by using said Internet-based bank connection. Because the purchase of the services or goods on one hand and the payment transaction on the other hand are mutually independent transactions that take place at different times, the service or goods provider always has the risk that the customer does not pay the bill, at least not according to the agreed schedule.

In case the service or goods provider wishes to avoid credit risks, there can be used a system with a continuous data transmission connection, or then a data transmission connection to an account database of a bank or a credit organization can be established separately for each purchase. Prior to the purchase operation, the identity of the customer is checked, as well as the fact that the customer has enough funds for settling the payment required by the purchase. This arrangement eliminates the credit risk for the vendor, but it requires quite a lot of data transmission traffic between the vending party and the database of the credit organization. In the case of minor purchases, the share of verification and data transmission expenses may rise fairly high in comparison with the size of the payment itself.

The object of the present invention is to introduce a new type of procedure and hardware arrangement, whereby an electronic payment transaction can be carried out without risks and cost-effectively in connection with various automatic goods or service vending machines.

The objects of the invention are achieved by means of a procedure and hardware arrangement where the data related to the payment transaction and referring to the customer are verified by a certificate given by a credit organization. By means of said certificate, the service or goods provider can verify that the purchase desired by the customer can be delivered to him.

The method according to the invention for making a purchase and paying for it is characterized in that when granting credit to the customer, the creditor gives the customer an electronic certificate that is stored in the electronic device of the customer, that the customer produces said certificate to an automatic vending machine in connection with a purchase, and that the authenticity of said certificate is verified in the automatic vending machine prior to delivering the goods or services.

The arrangement according to the invention for making a purchase and paying for it is characterized in that the data system managed by the creditor is arranged to grant customer-specific certificates which are arranged to be transmittable, by a wireless data transmission connection, to an electronic device used by the customer, from which device the certificate can, in order to make a purchase and pay for it, be produced in an electronic purchase document to the automatic goods or services vending machine in order to accept the transaction.

The electronic device according to the invention is characterized in that it comprises means for storing the certificate given by the creditor and for using said certificate for verifying the payment connected to a purchase operation.

The software application according to the invention, provided in the creditor's data system, is characterized in that it comprises:
  means for receiving customer data,
  means for encrypting customer data, means for electronically signing customer data, and means for transmitting signed customer data to an electronic device at the customer's disposal in order to enable the purchases made by the customer.

The software application according to the invention, provided in the electronic device at the customer's disposal, is characterized in that it comprises:

means for receiving the certificate granted by the creditor, means for storing the received certificate in an electronic device, means for receiving an ID-identification transmitted by an automatic service and goods vending machine, and means for integrating said certificate and ID-identification as part of the purchase document for making the purchase in an automatic service or goods vending machine.

The software application according to the invention, provided in the automatic service and goods vending machine, is characterized in that it comprises:

means for creating an ID-identification, means for transmitting the ID-identification in one of the following ways: according to the WAP protocol, according to the xHTML protocol or according to the Obex protocol, means for receiving the purchase document transmitted by an electronic device, means for verifying the ID-identification provided in the purchase document, means for verifying the authenticity of the certificate provided in the purchase document, means for verifying and registering the purchase data, and means for transmitting the purchase data to the creditor when a predetermined criterion is fulfilled.

Preferred embodiments of the invention are set forth in the independent claims.

The basic idea of the invention is as follows: payment arrangements are organized by a credit institution or service provider. Each customer who wants to utilize the system must be in connection with said crediting party. The crediting party opens a specific account for each customer on the basis of obtained identification information. Said information is encrypted and verified by the crediting party by its own electronic signature. Thereafter the encrypted and signed customer information is transferred to the electronic device of the customer/debtor, which device advantageously is a mobile station of a cellular network. In said device, there can be installed a software application that is below called an electronic wallet. If the WAP (Wireless Application Protocol) is employed in the data transmission, a separate wallet application is not necessarily needed in the electronic device, but a browser according to the WAP specification is sufficient. A browser according to the xHTML protocol (extensible Hyper Text Markup Language) also is possible, in which case its operation corresponds to said WAP browser. If the data transmission protocol employed either in the credit arrangements or in the payment transaction proper is other than the WAP protocol, the electronic device must be provided with an independent application whereby the electronic wallet is realized.

When the customer wishes to make a purchase with the electronic wallet in an automatic service or goods vending machine, his electronic device/terminal connected to the electronic wallet advantageously establishes a Bluetooth-based radio path connection with the automatic service or goods vending machine. In the next step, the automatic service or goods vending machine sends a WAP message to the customer's electronic device, which message advantageously includes a temporary ID (IDentification) given separately for each purchase. The customer pays for the purchase by sending as a response the purchase document in a WAP message, including information of said purchase, the certificate granted by the creditor to the customer and the temporary identification ID. Both the ID identification and the certificate verified by the creditor can be checked as an offline function provided in the automatic vending machine of the service or goods provider. If the information is acceptable, the customer obtains the desired service or goods. Said accepted purchase is charged later, together with several other purchases carried out in said automatic vending machine.

The advantage of the invention is that the identification of the customer/payer can be carried out without having to establish for each purchase a data transmission connection to the data system of the company that is the customer's creditor. This saves both time and various expenses created in connection with data transmission systems.

Another advantage of the invention is that it can be used for preventing attempts to purchase goods or services with false user information.

Another advantage of the invention is that in structure, the system is simpler than payment systems based on an online connection.

Figure 2:
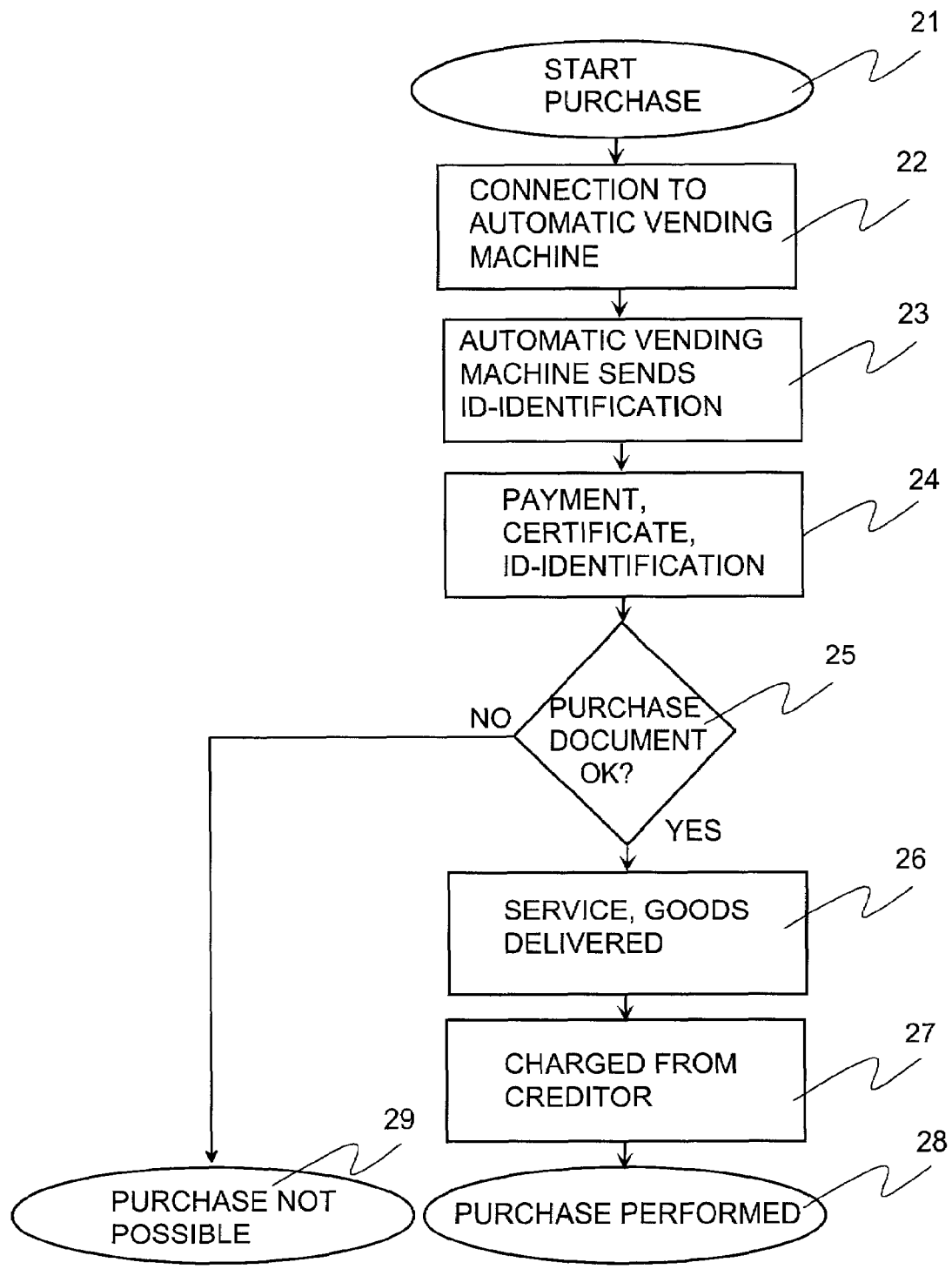
Figure 3:
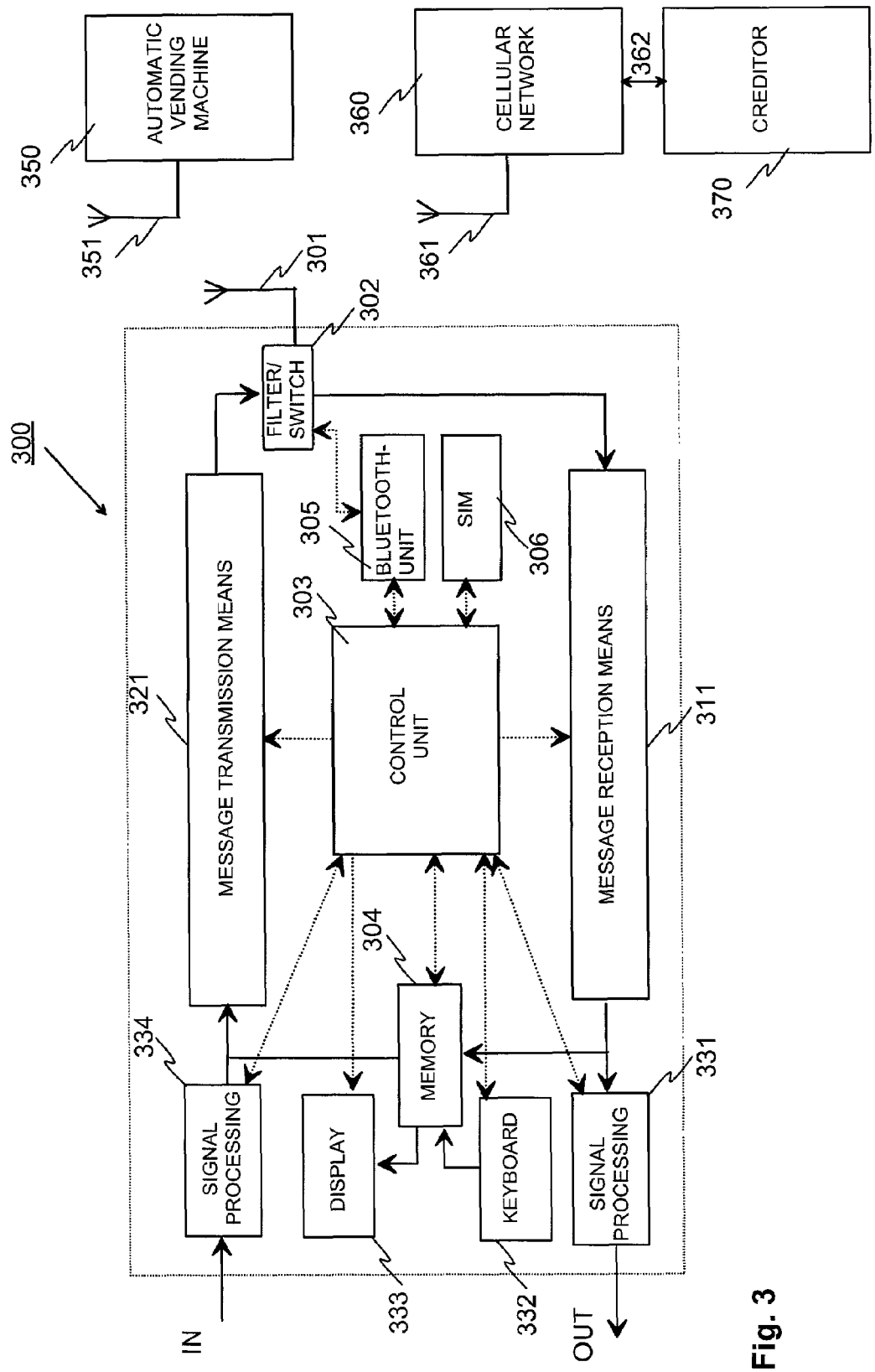

The invention is explained in more detail below, with reference to the appended drawings, where FIG. 1 illustrates, by way of example, a purchase and payment arrangement according to the invention, FIG. 2 illustrates, as an exemplary flow diagram, the main steps of the purchase and payment procedure according to the invention, and FIG. 3 illustrates, by way of example, a terminal device utilizing the method according to the invention.

FIG. 1 shows, by way of example, the parts/parties of the purchase and payment arrangement according to the invention. The purchasing party is the customer 10, who has at his disposal an electronic device 13, which is advantageously a terminal 13 of a cellular network. In said terminal 13, there is installed or can be installed a software application called an electronic wallet. The purchase arrangement is coordinated by an organization 11. Advantageously said organization is a bank or a crediting enterprise, or it can also be an enterprise that itself sells services or goods. Said party 11 is below called the creditor. The third party in the purchase and payment arrangement is an automatic vending machine 14, or mainly the enterprise owning said machine. For money or a corresponding medium of exchange, goods or services can be purchased from said vending machine 14.

The creditor 11 of the purchase system makes credit agreements both with single customers 10 and with the enterprise owning the vending machine 14. The creditor 11 gives each customer 10 a document, against which document the customer 10 obtains goods or services for instance from the vending machine 14. Said document is below called a certificate. The agreement between the creditor 11 and the enterprise owning the vending machine 14 includes a condition, according to which the creditor 11 is responsible for the purchases made by the customer 10 who has obtained the certificate. Thus the credit information of the customer 10 need not be verified at the creditor 11 through an online connection in case of a purchase. The purchases made from the vending machine 14 are charged from the creditor 11, advantageously in batches that contain the data of several separate purchases.

One advantageous embodiment of the certificate comprises data included in a casual bank or credit card. The information in the magnetic strip or in the microchip of the card is advantageously included in the certificate. The creditor 11 encrypts the information of the card and signs the customer's certificate data by its own electronic signature, by using its own personal encryption key. The machine can verify the sertificate advantageously by using key management of EMV payment system (Europay, Mastercard, Visa).

The operation of the purchase arrangement according to the invention advantageously comprises the following steps. The customer 10 wishes to use an electronic wallet in his terminal 13. Now the customer 10 establishes a connection 15A to one of the creditors 11 coordinating the system. Advantageously the connection 15A is an electronic data transmission. In that case the WAP protocol can be advantageously utilized. By employing electronic data transmission, there is achieved the advantage that the data related to the customer 10 can be updated as an online operation both in the data system 12 of the creditor 11 and in the electronic wallet provided in the terminal 13 of the customer 10. However, it is obvious that the data transmitted over said connection 15A can be transmitted for the use of the data system in some other way, for instance by writing a letter or by visiting the creditor 11. During the connection 15A, the customer 10 gives the creditor 11 the required information or a pawn. On the basis of the received information/pawn, the creditor 11 accepts the information of the customer 10 and grants a certificate for said customer 10.

In a first preferred embodiment of the invention, the creditor 11 uses an asymmetric encryption technique for encrypting the customer information. In that case the creditor 11 encrypts the information of the customer 10 and signs the customer's certificate data by its own electronic signature, by using its own personal encryption key. Advantageously the creditor stores the certificate in a WIM module (Wireless Identity Module) provided in the customer terminal 13. Thus an encrypted and electronically signed file, i.e. a certificate, is created. In addition, the creditor can give each customer a secret personal key, which can be used in the signing step in order to additionally ensure that the customer is exactly the person to whom the certificate was granted. The information of said certificate 14 can be checked by the vending machine 14 in advance by using a public encryption key of the known creditor 11. Thus the vending machine 14 always obtains reliable information that the produced certificate is authentic and that it is really used by the customer 10, mentioned in the certificate. In said certificate granted by the creditor, the creditor 11 can add other information for guiding the usage thereof. Said information can be for instance advices for a case where the user cannot be identified, or the duration of validity of the certificate.

In step 15B, the creditor 11 sends the created certificate to the terminal 13 of the customer 10, advantageously as a WAP message. Advantageously the certificate is stored in the SIM card (Subscriber Identity Module) of the customer 10, in the WIM module provided in said SIM card. The certificate can also be stored in a WIM program system or electronic wallet separately realized in the terminal. The electronic wallet can be realized as an application in the Java language, i.e. as a so-called applet, which is transmitted in connection with the granting of the certificate either to the memory of the terminal device or to the SIM card provided in the terminal. By means of the procedures described above, the credit information of the customer is permanently connected to the rest of the customer's identification data.

In the first step of the purchase procedure proper, the terminal 13 and the vending machine 14 establish a short-path radio connection between them. The connection is advantageously established by using the Bluetooth technique. Naturally the connection can be established by other prior art methods, such as for instance the infrared connection (IrDA). The data transmission procedure is advantageously a procedure according to the WAP protocol. As an alternative, there can be utilized message-wise procedures, such as OBEX messages (Object Exchange), in which case the terminal device must include a separate application, an electronic wallet, for performing the payment. In said data transmission, also the MIME protocol or the vCard protocol can be utilized. Through said connection, the terminal 13 sends a message 16A, telling the vending machine 14 that the terminal is preparing the making of a purchase. The vending machine 14 responds by a message 16B, which contains the temporary ID identification given for this transaction only. Advantageously the ID identification contains a time definition, the serial number of the terminal 13 and a random number. Said information is encrypted in a way known to the vending machine 14 prior to sending the message to the terminal 13. This procedure prevents any later utilization of said information, should unauthorized parties have seized the information from the radio path between the terminal 13 and the vending machine 14.

In the next step the terminal 13 sends the purchase message/purchase document 17 proper, containing the purchase definition, the certificate granted by the creditor and the purchase-specific ID identification received in the preceding step. Advantageously the purchase document 17 is electronically signed by the customer by using his own secret key, in which case it is ensured that the customer is the person to whom the certificate was granted. The terminal 13 has not performed any additional operations to the received ID identification, but returns it to the vending machine as such. The vending machine 14 receives the ID identification, de-encrypts it and uses it for verifying that the vending machine 14 is still connected to the given terminal 13. Thereafter the vending machine 14 uses the public encryption key of the known creditor 11 in order to open the received certificate of the customer. If the opening succeeds, it is possible to check that the customer is exactly the person that he says he is, and that he has credit provided by the creditor 11.

In the next step the vending machine 14 immediately delivers the product or service 18 desired by the customer 10 without checking the customer's credit information through an online connection. This speeds up the purchase transaction essentially. In the same connection, the vending machine 14 registers in its memory all specific information connected to the performed purchase. The vending machine 14 collects all separate pieces of purchase information in its memory and sends them, when a predetermined condition is fulfilled, to the creditor 11 proper in a uniform message 19. Advantageously said message 19 contains the data of the purchases of several different customers. By means of this procedure, the data transmission expenses between the vending machine 14 and the creditor 11 can be reduced.

In another preferred embodiment of the invention, a symmetrical encryption technique is used for encrypting the customer information. In this embodiment, the creditor 11 encrypts the credit information of the customer 10 by a symmetrical encryption key. In addition to the encrypted credit information, in the created certificate there is included an identification number in a non-encrypted form. In another embodiment of the invention, also said other identification number is encrypted. Said information thus constitutes the certificate that is sent to the customer's terminal 13.

The certificate created in connection with the purchase transaction is transmitted, complete with all included information, to the vending machine 14 in connection with the message 17. The vending machine 14 forms, by using a secret calculation system known to it, a new key that it needs in the de-encryption of the certificate on the basis of the secret identification number revealed to it by the creditor and the customer-specific identification number transmitted to it in connection with the certificate. If the identification number formed by the vending machine 14 on the basis of the customer-specific key corresponds to the identification number given in the certificate, it is considered that the producer of the certificate is identified. In other respects, the second preferred embodiment of the invention corresponds, in its basic functions, to the first preferred embodiment described above.

FIG. 2 illustrates, in an exemplary flow diagram, how the purchase and payment transaction according to the invention proceeds. The purchase is started at step 21. Now the customer 10 chooses in the terminal 13 a function whereby he can make the desired purchase in a given service/goods vending machine 14 by means of an electronic wallet provided in said terminal 13. An active radio path connection is established between the terminal 13 and the vending machine 14 no later than in step 22. Advantageously the radio path connection is established as a Bluetooth connection, where the employed transmission protocol is advantageously the WAP protocol. The establishing of an active connection in step 23 results in that the vending machine 14 sends the ID identification created by it to the terminal 13 in an encrypted form. Said ID identification advantageously comprises the serial number of the Bluetooth of the terminal 13, some time-related information and a random number. The terminal 13 receives said ID identification but does neither modify it nor add any information.

In step 24, the terminal 13 sends the purchase document proper to the vending machine 14. Said purchase document contains the identification information describing the purchase, the certificate sent to the customer 10 by the creditor 11 and encrypted by the personal key of the creditor, as well as the above-mentioned ID identification. In step 25, the vending machine 14 checks the authenticity of the certificate and the ID identification. If the checking operation results in non-acceptance, the goods or the service in question is not delivered to the customer, and the operation ends at step 29. If the result of the checking operation 25 is acceptance, the operation proceeds to step 26, where the ordered service or goods is delivered to the customer who ordered it. The identification information of the purchase made during step 26 is stored in the memory of the vending machine 14.

The vending machine 14 collects the identification information of all separate purchases made through it. When a predetermined criterion is fulfilled, the vending machine 14 establishes a data transmission connection with the data system 12 of the creditor 11 and transmits the purchase identification information stored in its memory to the data system of the creditor 11 in step 27. Also this data transmission procedure is advantageously carried out as encrypted. Now the creditor 11 charges the performed purchases from the account of the customer 10, said account being provided in a bank or in a credit organization. We have reached step 28, where the purchase is made and paid for. In the method according to the invention, it is particularly pointed out that the customer can with certainty be identified without having to perform purchase-specific verifications from the data system 12 of the creditor 11. This speeds up the purchase process and increases its cost-effectivity remarkably.

FIG. 3 illustrates, by way of example, a cellular network terminal 300, the cellular network 360 utilized by the terminal 300, the organization 370 providing credit for the purchase and a vending machine 350 supporting the operation according to the invention. The terminal 300 illustrated in FIG. 3, which terminal 300 advantageously utilizes the WAP protocol, comprises an antenna 301 for receiving the radio-frequency RF signals transmitted by the base stations of the cellular network 360. The received RF signal is conducted, by a switch 302, to the message reception means 311, where the signal is amplified, modified into digital form, detected and demodulated, whereafter the encryption and interleaving used in the message connection is de-encrypted and deinterleaved. Then the signal is processed in block 331. The received data can as such be stored in the memory 304 of the terminal, or as an alternative, the processed packet data is transmitted, after signal processing, for instance to a SIM card 306 or to another external device. The control unit controls the above-mentioned reception blocks according to the application program stored therein.

The transmission operation from the terminal 300 is carried out as follows, for instance. Under the control of the control unit 303, the data transmitted in block 334 is subjected to a possible signal processing, whereafter the processed signal to be transmitted is interleaved and encrypted in the message transmission means 321, bursts are formed, the signal is modulated and finally the signal is amplified to be sent as an RF signal. The RF signal to be transmitted is conducted to the antenna 301 by intermediation of the switch 302. Said transmission operations are also controlled by the control unit 303.

In the cellular network terminal 300 illustrated in FIG. 3, essential elements from the point of view of the invention are the control unit 303 of the terminal, which control unit processes the data contained in the received or transmitted messages and normally controls the operation of the terminal, the SIM card 306 connected to the terminal, in which card the certificate granted by the creditor is advantageously stored, the Bluetooth unit 305 that takes care of the data transmission with the vending machine 350, as well as the memory 304 of the terminal, part of which memory must be dedicated to storing the applications and information used in the operation according to the invention. The data transmitted by the terminal can be surveyed in the display 333 of the terminal, and various procedures carried out by the terminal can be controlled by using the keyboard 332.

Advantageously the antenna 301 belonging to the terminal takes care of the data transmission both in the cellular network proper and in the Bluetooth environment. The filter 302 and the antenna 301 can both comprise several physical structures. In case the Bluetooth connection is realized by means of the infrared technique, the terminal also needs an IR transceiver, not illustrated in FIG. 3.

For a man skilled in the art, it is obvious that the cellular network 360 also comprises elements that are essential parts of the cellular network but are not illustrated in FIG. 3. The cellular network 360 communicates with terminals 300 located within its range of operation through antennas 361 that are provided in connection with the base stations of the cellular network. In the purchase and payment arrangement according to the invention, a credit-providing organization 370 is connected to the described cellular network system. Said organization 370 and the cellular network exchange messages over the connection 362.

In order to be able to implement the method according to the invention, an application program according to the invention must be installed in the terminal 300, by means of which program the creditor's certificate is received and stored in the terminal, either in its electronic memory or in a SIM card provided in the terminal. Likewise the terminal needs an application program for performing the data transmission to the automatic service or goods vending machine. Advantageously the certificate according to the invention can be realized as an application in the Java language, which application is then transmitted to the terminal. In that case it advantageously contains both the certificate itself and the software applications needed when using the certificate.

Also in the automatic service and goods vending machine 350, there is needed an application program that takes care of all procedures connected to purchase and payment, both with the creditor's data system and with the customer's terminal. Likewise, in the creditor's data system 370, there must be installed an application program whereby the certificate according to the invention is created in the creditor's data system and transmitted to the customer's terminal. Further, there is needed an application program whereby information connected to the purchases can be transmitted from the automatic service and goods vending machine to the creditor's data system.

In the specification above, a few preferred embodiments of the invention are described. The invention is not restricted to the described embodiments only. For instance the encryption of the certificate can be performed in some other way than the exemplary methods illustrated above. Likewise, the data transmission between the terminal and the vending machine can be carried out by several other data transmission techniques and protocols than the described Bluetooth technique, for example by Obex, MIME and vCard. The inventive idea can be modified in many different ways within the scope of the appended patent claims.

The invention claimed is:

1. A method for making a purchase and paying for the purchase with a wireless electronic device, the method comprises:
   granting credit from a creditor to a customer, the granting of credit to the customer includes the creditor giving to the customer an electronic certificate, which is stored in the wireless electronic device of the customer, the electronic certificate including a commitment by the creditor to pay the purchase on behalf of the customer without checking a monetary balance of the customer during the purchase;
   using the electronic device in order to establish a wireless connection with an automatic service or goods vending machine, wherein the certificate granted by the creditor is partly encrypted by a symmetrical encryption key formed on the basis of information known both to the creditor and to the vending machine and information that can be calculated from data contained in the certificate; and
   wirelessly utilizing the electronic certificate contained in the electronic device when making the purchase in the automatic service or goods vending machine and verifying the authenticity of the certificate in the vending machine prior to delivering goods or services;
   whereafter the vending machine delivers the goods or services to the customer without checking the monetary balance of the customer based on the commitment and charges the creditor for the purchase after the goods or services are delivered.

2. A method according to claim 1 wherein the certificate granted by the creditor is signed electronically by a personal, asymmetric encryption key belonging to the creditor in order to guarantee the authenticity of the certificate.

3. A method according to claim 2 wherein the certificate granted by the creditor comprises information included in a bankcard or a credit card granted to the customer.

4. A method according to claim 2 wherein in the vending machine there is used a public, asymmetric encryption key belonging to the creditor for opening the electronic signature contained by the certificate.

5. A method according to claim 2 wherein the customer data contained by the certificate is encrypted by an asymmetric encryption key.

6. A method according to claim 2 wherein a customer data contained by the certificate is encrypted by a symmetric encryption key.

7. A method according to claim 1 wherein the certificate granted by the creditor is completely encrypted by a symmetrical encryption key known both to the creditor and to the vending machine.

8. A method according to claim 1 wherein the certificate provided in electronic form is an application in a Java language, which application is after reception installed in the customer's electronic device.

9. A method according to claim 1 wherein the use of the automatic service or goods vending machine comprises:
   establishing a radio path connection between the electronic device and the vending machine;
   sending an ID identification from the vending machine to the electronic device;
   sending a purchase document from the electronic device to the vending machine;
   checking a content of the purchase document in the vending machine in an offline mode;
   delivering the ordered goods or services to the customer; and
   charging the creditor of the purchase made by the customer, when a predetermined criterion is fulfilled, wherein the vending machine charges the creditor.

10. A method according to claim 9 wherein the ID identification comprises an encrypted time definition, an encrypted serial number of the electronic device and an encrypted random number.

11. A method according to claim 9 wherein the purchase document contains a purchase definition, the certificate and the ID identification.

12. A method according to claim 9 wherein a Bluetooth technique is employed in a data transmission between the electronic device and the vending machine.

13. A method according to claim 9 wherein an infrared technique is employed in a data transmission between the electronic device and the vending machine.

14. A method according to claim 9 wherein data to be transmitted are transmitted as messages according to a WAP protocol.

15. A method according to claim 9 wherein data to be transmitted are transmitted as messages according to an Obex protocol.

16. A method according to claim 9 wherein data to be transmitted are transmitted as messages according to a vCard protocol.

17. A method according to claim 9 wherein data to be transmitted are transmitted as messages according to a MIME protocol.

18. A method according to claim 1 wherein the electronic device is a cellular network terminal.

19. An arrangement for performing a purchase and respective payment with a wireless electronic system, said arrangement comprising:
   a wireless electronic device at the disposal of a customer;
   an automatic service or goods vending machine configured to deliver goods or services to a customer, wherein a monetary balance of the customer is not checked before the goods or services are delivered based on a commitment to pay; and a data system managed by a creditor, from which data system there can be established a wireless data transmission connection both to the customer's wireless electronic device and to the automatic service and goods vending machine;

where the data system is further arranged to grant customer-specific certificates, the customer-specific certificates including the commitment to pay by the creditor the purchase on behalf of the customer without checking the monetary balance of the customer during the purchase, and wherein the customer-specific certificate is partly encrypted by a symmetrical encryption key formed on the basis of information known both to the creditor and to the vending machine and information that can be calculated from data contained in the customer-specific certificate;

which customer-specific certificates are arranged to be transmitted, by means of a wireless data transmission connection, to the wireless electronic device at the customer's disposal, from which device the customer-specific certificate is, in order to make a purchase and pay for it, arranged to be produced in an electronic purchase document for the automatic service or goods vending machine in order to accept the purchase.

20. An arrangement according to claim 19 wherein the information of the purchase also is arranged to be stored in a memory of the automatic service or goods vending machine, until a predetermined criterion is fulfilled.

21. An arrangement according to claim 20 wherein when the predetermined criterion is fulfilled, the automatic service or goods vending machine is arranged to establish a data transmission connection to the data system of the creditor in order to transfer the purchase information to said data system for carrying out the respective payment.

22. An arrangement according to claim 19 wherein the data system of the creditor is arranged to exchange messages both with the automatic service or goods vending machine and with the electronic device as messages according to a WAP protocol.

23. An arrangement according to claim 19 wherein the data system of the creditor is arranged to exchange messages both with the automatic service or goods vending machine and with the electronic device as messages according to an xHTML protocol.

24. An arrangement according to claim 19 wherein the data transmission between the electronic device and the automatic service or goods vending machine is arranged to be carried out by utilizing a Bluetooth technique.

25. An arrangement according to claim 19 wherein the data transmission between the electronic device and the automatic service or goods vending machine is arranged to be carried out by utilizing an infrared technique.

26. An arrangement according to claim 19 wherein the certificate comprises an encrypted customer information and an electronic signature of the creditor.

27. An arrangement according to claim 26 wherein the customer information is signed by using a key of EMV payment key management.

28. An arrangement according to claim 19 wherein the purchase document comprises information of the purchase, a transaction-specific ID-identification and a customer-specific certificate.

29. An arrangement according to claim 19 wherein the automatic service or goods vending machine comprises means for utilizing a Bluetooth-based data transmission connection, means for processing messages according to a WAP protocol and means for receiving and checking customer-specific certificates.

30. An arrangement according to claim 19 wherein the automatic service or goods vending machine comprises means for utilizing an infrared-based data transmission connection, means for processing messages according to a WAP protocol and means for receiving and checking customer-specific certificates.

31. An arrangement according to claim 19 wherein the automatic service or goods vending machine comprises means for utilizing a Bluetooth-based data transmission connection, means for processing messages according to an Obex protocol and means for receiving and checking customer-specific certificates.

32. An arrangement according to claim 19 wherein the automatic service or goods vending machine comprises means for utilizing an infrared-based data transmission connection, means for processing messages according to an Obex protocol and means for receiving and checking customer-specific certificates.

33. An arrangement according to claim 19 wherein the automatic service or goods vending machine comprises means for utilizing a Bluetooth-based data transmission connection, means for processing messages according to an xHTML protocol and means for receiving and checking customer-specific certificates.

34. An arrangement according to claim 19 wherein the automatic service or goods vending machine comprises means for utilizing an infrared-based data transmission connection, means for processing messages according to an xHTML protocol and means for receiving and checking customer-specific certificates.

35. A wireless electronic device operated in a wireless data transmission network, which wireless electronic device comprises:

means for registering a certificate granted by a creditor, the certificate including a commitment to pay a purchase on behalf of a customer, the purchase being from an automatic service or goods vending machine configured to deliver goods or services to a customer, and wherein a monetary balance of the customer is not checked during the purchase, and wherein the certificate granted by the creditor is partly encrypted by a symmetrical encryption key formed on the basis of information known both to the creditor and to an automatic services or goods vending machine configured to deliver goods or services to the customer, and information that can be calculated from data contained in the certificate; and means for using the certificate as a verification of a payment connected to the purchase transaction.

36. An electronic device according to claim 35 which comprises a SIM card in order to save the information contained by the certificate.

37. An electronic device according to claim 35 which comprises a Bluetooth unit for establishing a data transmission connection between the electronic device and an automatic service or goods vending machine.

38. An electronic device according to claim 35 which comprises an infrared unit for establishing a data transmission connection between the electronic device and an automatic service or goods vending machine.

39. An electronic device according to claim 35 which also comprises means for receiving an ID identification sent by an automatic service or goods vending machine.

40. An electronic device according to claim 39 which also comprises means for sending a purchase document to the automatic service or goods vending machine in order to make a purchase and pay for the purchase.

41. An electronic device according to claim 40 which comprises means for including in the purchase document: purchase information, the ID identification and the certificate, the certificate being customer-specific.

42. An electronic device according to claim 35 which is a terminal of a cellular network.

43. A computer program product comprising:
a computer useable medium provided in a data system of a creditor having computer readable code means embodied therein for causing a computer to enable purchases by a customer from an automated services or goods vending machine, the computer readable code means in the computer program product comprises:
   computer readable code means for causing a computer to receive customer information;
   computer readable code means for causing a computer to encrypt customer information;
   computer readable code means for causing a computer to electronically sign customer information;
   computer readable code means for causing a computer to transmit signed customer information wirelessly to a wireless electronic device at the customer's disposal in order to enable purchases by the customer; and
   computer readable code means for causing a computer to include a certificate in the customer information, the certificate includes a commitment to pay purchases on behalf of the customer, and wherein the certificate is partly encrypted by a symmetrical encryption key formed on the basis of information known both to the creditor and to the vending machine and information that can be calculated from data contained in the certificate, wherein the purchases are delivered to the customer without checking a monetary balance of the customer during the purchases based on the commitment.

44. A computer program product according to claim 43 stored in a data recording medium.

45. A computer program product comprising:
a computer useable medium provided in a wireless electronic device at the disposal of a customer having computer readable code means embodied therein for causing a computer to enable purchases from an automated services and goods vending machine by the customer, the computer readable code means in the computer program product comprises:
   computer readable code means for causing a computer to receive a certificate granted by a creditor, the certificate including a commitment to pay for a purchase on behalf of the customer without checking a monetary balance of the customer during the purchase, and wherein the certificate is partly encrypted by a symmetrical encryption key formed on the basis of information known both to the creditor and to the vending machine and information that can be calculated from data contained in the certificate;
   computer readable code means for causing a computer to store the received certificate in the electronic device;
   computer readable code means for causing a computer to receive an ID identification sent by an automatic service and goods vending machine wirelessly; and
   computer readable code means for causing a computer to integrate the certificate and the ID identification as part of a purchase document in order to make the purchase in the automatic service or goods vending machine, wherein goods or services are delivered to the customer without checking a monetary balance of the customer during the purchase based on the commitment.

46. A computer program product according to claim 45 which is arranged to be transmitted and stored in the electronic device as an application in a Java language in connection with granting the certificate.

47. A computer program product comprising:
a computer useable medium provided in an automatic service or goods vending machine having computer readable code means embodied therein for causing a computer to enable purchases by a customer, the computer readable code means in the computer program product comprises:
   computer readable code means for causing a computer to form an ID identification;
   computer readable code means for causing a computer to send the ID identification wirelessly in one of a WAP protocol, an xHTML protocol, or an Obex protocol;
   computer readable code means for causing a computer to receive a purchase document sent wirelessly by a wireless electronic device, the purchase document including the ID identification;
   computer readable code means for causing a computer to check the ID identification contained in the purchase document;
   computer readable code means for causing a computer to verify an authenticity of a certificate provided in the purchase document, the certificate including a commitment of a creditor to pay a purchase on behalf of the customer, and wherein the certificate is partly encrypted by a symmetrical encryption key formed on the basis of information known both to the creditor and to the vending machine and information that can be calculated from data contained in the certificate, wherein goods or services are delivered to the customer without checking a monetary balance of the customer during the purchase based on the commitment;
   computer readable code means for causing a computer to check and save purchase information; and
   computer readable code means for causing a computer to transmit the purchase information to the creditor when a predetermined criterion is fulfilled.

* * * * *